US011914085B2

(12) United States Patent
Ritter et al.

(10) Patent No.: US 11,914,085 B2
(45) Date of Patent: Feb. 27, 2024

(54) PLASTIC SCINTILLATOR BASED ON AN ORGANIC POLYADDITION PRODUCT

(71) Applicant: TARGET SYSTEMELEKTRONIK GMBH & CO. KG, Wuppertal (DE)

(72) Inventors: Helmut Ritter, Wuppertal (DE); Olga Leonidovna Maiatska, Wuppertal (DE); Jürgen Stein, Wuppertal (DE)

(73) Assignee: TARGET SYSTEMELEKTRONIK GMBH & CO. KG, Wuppertal (DE)

( * ) Notice: Subject to any disclaimer, the term of this patent is extended or adjusted under 35 U.S.C. 154(b) by 354 days.

(21) Appl. No.: 16/641,774

(22) PCT Filed: Aug. 27, 2018

(86) PCT No.: PCT/EP2018/072982
§ 371 (c)(1),
(2) Date: Feb. 25, 2020

(87) PCT Pub. No.: WO2019/042920
PCT Pub. Date: Mar. 7, 2019

(65) Prior Publication Data
US 2020/0249362 A1 Aug. 6, 2020

(30) Foreign Application Priority Data

Aug. 28, 2017 (DE) ..................... 10 2017 119 683.8

(51) Int. Cl.
| | |
|---|---|
| *G01T 1/203* | (2006.01) |
| *C08G 18/12* | (2006.01) |
| *C08G 18/48* | (2006.01) |
| *C08G 18/75* | (2006.01) |
| *C08G 18/76* | (2006.01) |
| *G01T 3/06* | (2006.01) |
| *G21K 4/00* | (2006.01) |

(52) U.S. Cl.
CPC ............ *G01T 1/2033* (2013.01); *C08G 18/12* (2013.01); *C08G 18/4879* (2013.01); *C08G 18/755* (2013.01); *C08G 18/765* (2013.01); *C08G 18/7642* (2013.01); *G01T 1/203* (2013.01); *G01T 3/06* (2013.01); *C09K 2211/1425* (2013.01); *G21K 2004/08* (2013.01)

(58) Field of Classification Search
CPC .. C08G 18/12; C08G 18/4879; C08G 18/755; C08G 18/7642; C08G 18/765; C09K 2211/1425; G01T 1/2033; G01T 1/203; G01T 3/06; G21K 2004/08
See application file for complete search history.

(56) References Cited

U.S. PATENT DOCUMENTS

| | | | | |
|---|---|---|---|---|
| 5,334,690 | A | * | 8/1994 | Schafheutle ....... C08G 18/4676 528/71 |
| 9,650,564 | B2 | | 5/2017 | Zaitseva et al. |
| 2004/0211917 | A1 | | 10/2004 | Adamovics |
| 2005/0208290 | A1 | | 9/2005 | Patel |
| 2013/0299702 | A1 | * | 11/2013 | Zaitseva ................. G21K 4/00 250/361 R |
| 2014/0166890 | A1 | | 6/2014 | Shimizu |
| 2014/0332689 | A1 | | 11/2014 | Van Loef et al. |

FOREIGN PATENT DOCUMENTS

| | | | |
|---|---|---|---|
| WO | 9621885 A1 | | 7/1996 |
| WO | 2008033659 A1 | | 3/2008 |
| WO | WO 2010/003222 | * | 1/2010 |
| WO | 2017084898 A1 | | 5/2017 |

OTHER PUBLICATIONS

International Preliminary Report on Patentability dated Mar. 3, 2020 for PCT/EP2018/072982.
Kolanoski, Hermann; Wermes, Norbert: Particle Detectors: Principles and Applications Heidelberg: Springer Spektrum, 2016.—ISBN 978-3-662-45349-0.
Lambert, J., et al. A plastic scintillation dosimeter for high dose rate brachytherapy. Physics in medicine and biology, 2006, 51st vol., No. 21, p. 5505.
CMS Collaboration, et al. CMS physics technical design report, vol. II: physics performance. Journal of Physics G: Nuclear and Particle Physics, 2007, 34. Vol., No. 6, p. 995.
Abdo, Aous A., et al. "Measurement of the cosmic ray e ++ e- spectrum from 20 GeV to 1 TeV with the Fermi Large Area Telescope." Physical Review Letters 102.18 (2009): 181101.
Ely, James H., et al. Discrimination of naturally occurring radioactive material in plastic scintillator material. In: Nuclear Science Symposium Conference Record, 2003 IEEE. IEEE, 2003. pp. 1453-1457.
Knoll, Glenn F. Radiation detection and measurement. John Wiley & Sons, 2010., p. 247.
7 International Search Report dated Nov. 27, 2018 for PCT/EP2018/072982.

* cited by examiner

*Primary Examiner* — Patrick D Niland
(74) *Attorney, Agent, or Firm* — Schmeiser, Olsen & Watts, LLP

(57) ABSTRACT

Provided are transparent molded bodies for use as a scintillator for measuring the type and intensity of ionizing and non-ionizing radiation, including an organic polymer and, if desired, at least one additive which, under the influence of at least one of ionizing and non-ionizing radiation, emits scintillation radiation in the range from UV to IR light, the aim is to improve optical and mechanical properties, robustness against environmental influences and the manufacturability. This was achieved in that the organic polymer at least in part contains a polyaddition product of polyfunctional isocyanates and one or more polyfunctional hardener components.

15 Claims, 2 Drawing Sheets

PLASTIC SCINTILLATOR BASED ON AN ORGANIC POLYADDITION PRODUCT

CROSS-REFERENCE TO RELATED APPLICATIONS

Figure 1:
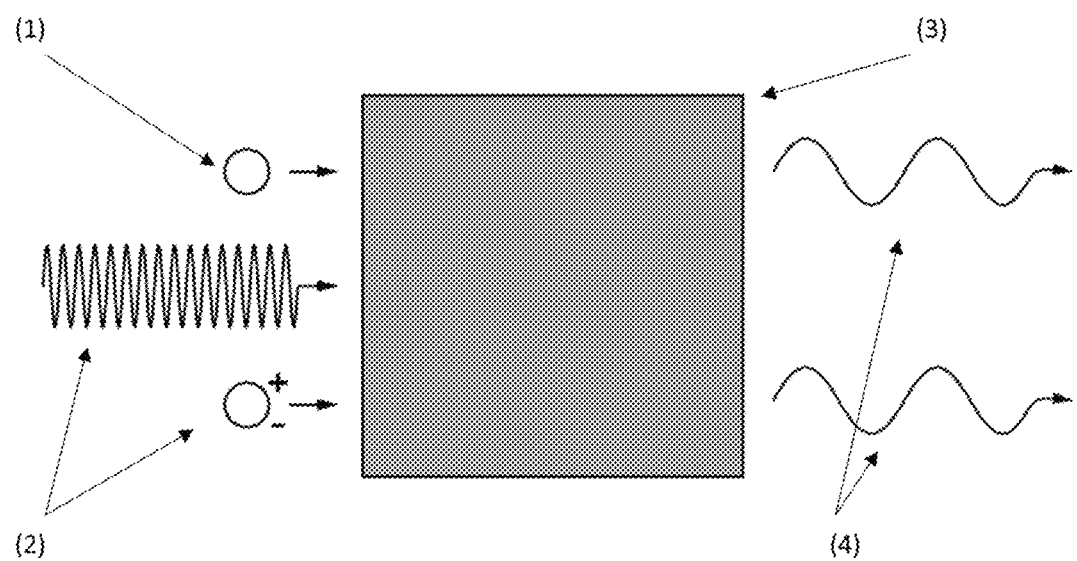

This application claims priority to PCT Application No. PCT/EP2018/072982, having a filing date of Aug. 27, 2018, based on German Application No. 10 2017 119 683.8, having a filing date of Aug. 28, 2017, the entire contents both of which are hereby incorporated by reference.

FIELD OF TECHNOLOGY

The following relates to a molded body based on an organic polyaddition product as a scintillator for measuring the type and intensity of at least one of ionizing and non-ionizing radiation. Such molded bodies belong to the class of plastic scintillators. They are used in radiation measuring devices which are used in nuclear physics, particle physics and astrophysics for the detection of ionizing radiation and the measurement of elementary particles. Other applications include dose rate measuring devices for radiation monitoring and radiation monitors in home protection and security areas.

BACKGROUND

Commercially available plastic scintillators often consist of polystyrene or polyvinyltoluene. They have the advantage of a relatively high light output (60-70% based on the reference material crystalline anthracene). However, it is disadvantageous that cloudiness occurs due to phase separation, particularly when exposed to moisture. Furthermore, discoloration and deterioration of the mechanical properties can occur during long-term use. Relevant polymers are described, for example, in the following patent publications:

US patent U.S. Pat. No. 9,650,564 B2 Lawrence Livermore National Security relates to a plastic scintillator with additives in a polymer matrix composed of polyvinyltetrahydronaphthalene, polyvinyldiphenyl, polyvinylxylene and 2,4,5-trimethylstyrol. Primary and secondary dyes and substances are known as additives that generate different signals when irradiated with thermal and fast neutrons.

US patent application US 2014/0332689 Radiation Monitoring Devices Inc. describes a plastic scintillator based on polymers having an aromatic ring structure and oxazoles and also a crosslinker, such as divinylbenzene.

Another disadvantage of the polymers for plastic scintillators that are established in practice is the fact that they consist of organic materials that bear benzylic hydrogens in each monomer unit. However, it has been known for decades that benzylic hydrogen atoms are very easily attacked by atmospheric oxygen and radicals. This leads to discoloration and deterioration in properties.

Furthermore, these materials corresponding to conventional art can usually only be produced from vinyl toluene and similar monomers if oxygen is excluded in the radical polymerization. This means a greater expenditure on equipment compared to systems such as casting resins.

Specialists have therefore tried to produce plastic scintillators based on other polymers. US patent application US 2014/0166890 A1, National Institute of Radiological Sciences Chiba and Teijin Ltd., describes a plastic scintillator based on a polyester. Although polyesters have found widespread use in plastics technology, their production requires esterification with elimination of water or alcohols at elevated temperatures and long reaction times, which is why they cannot be produced in the manner of casting resins.

In the international patent application WO 2008/033659, PPG Industries Ohio Inc., transparent plastic bodies are described which are suitable for spectacle lenses and the like and which are produced by curing polyurethane prepolymers having isocyanate end groups with amines in the presence of hydroxyphenylbenzotriazole and antioxidants. There is no reference to scintillators.

SUMMARY

An aspect relates to suitable polymer materials which meet the mechanical, metrological and processing technology requirements and which have the required long-term stability of the optical and mechanical properties. In particular, it is an aspect of embodiments of the invention to provide a polymer matrix for scintillators which can be processed simply in the manner of a casting resin. In addition, the matrix should be able to absorb scintillating substances without clouding and incompatibilities being observed.

Embodiments of the invention therefore relates to a transparent molded body for use as a plastic scintillator for measuring the type and intensity of at least one of ionizing and non-ionizing radiation, comprising an organic polymer and, if desired, at least one additive which, under the influence of at least one of ionizing and non-ionizing radiation, emits scintillation radiation in the range from UV to IR light, characterized in that the organic polymer, at least in part, contains a polyaddition product of polyfunctional isocyanates and one or more polyfunctional hardener components.

Embodiments of the relates in particular to a transparent molded body for use as a plastic scintillator for measuring the type and intensity of at least one of ionizing and non-ionizing radiation, comprising an organic polymer which, under the influence of ionizing and/or non-ionizing radiation, emits scintillation radiation from UV to IR light in the range from $\geq 100$ nm to $\leq 1000$ nm, the organic polymer being formed at least partially from the reaction of a polyaddition product of polyfunctional isocyanates, the polyfunctional isocyanates being selected from the group comprising di-, tri and/or tetraisocyanates, preferably diisocyanates, with one or more polyfunctional hardener components, the multifunctional hardener components being selected from the group comprising hydroxyl compounds, primary amines and/or secondary amines, wherein the functionality of the hydroxyl compounds, primary amines and/or secondary amines are $\geq 1$ to $\leq 10$, preferably $\geq 2$ to $\leq 4$ and especially $2\pm 0.2$.

Embodiments of the further relates to a process for producing such a molded body according to the claims, characterized in that auxiliaries and additives are dissolved in the alcohol component, the alcohol component and isocyanate component are mixed, if required a curing catalyst is added and the mixture is allowed to react in a form of the desired geometry until hardening.

Embodiments of the therefore relates in the broadest sense to scintillators for radiation measuring devices which comprise polyurethanes and/or polyureas as polymer matrix. Scintillating additives which are present as dissolved or dispersed particles in the polymer matrix or which can at least partially be incorporated into or bound to the polymer chain can be present as further constituents.

In the context of the description of embodiments of the invention, the word scintillator is used in a double sense, as is the case in professional terminology. As a plastic scintillator, it refers to the transparent solid that is suitable as a component of a measuring device. With the adjectives "primary" or "secondary", however, the term "scintillators" refers to the additives capable of scintillation, i.e. chemical substances.

Additives which may be used in accordance with embodiments of the invention can be selected from the group comprising 1,4-bis(2-methylstyryl)benzene (bis-MSB), 9,10-diphenylanthracene (DAN), 2,5-diphenyloxazole (PPO), 1,4-bis(2-(5-phenyloxazolyl))benzene (POPOP), naphthalene, biphenyl, p-terphenyl (TP), 1,1',4,4'-tetraphenylbutadiene, diphenylstilbene, 2-(1-naphthyl)-5-phenyloxazole (α-NPO), 2-phenyl-5-(4-biphenylyl)-1,3,4-oxadiazole (PBD), 2,5-di(4-biphenyl)oxazole (BBO), 1,4-di(2-(5-p-tolyloxazolyl))benzene (TOPOT), 1,4-di(2-(4-methyl-5-phenyloxazolyl))benzene (BiMePOPOP), 2-(diethoxyphenyl)-5-phenyl-1,3,4-oxadiazole (DF), 2-phenyl-5-(4-biphenyl)-1,3-oxazole (BPO), 1,3,5-triphenyl-Δ2-pyrazoline (3P-Δ2), 1,2-di(4-biphenylol)ethylene (BBE), 1-(4-biphenylyl)-2-α-naphthylethylene (BαNE), 2,5-bis(5-tert-butylbenzoxazol-2-yl)thiophene, 2-(4-tert-butylphenyl)-5-(4-biphenylyl)-1,3,4-oxadiazole, trans,trans-1,4-diphenyl-1,3-butadiene.

Substances for stabilizing the polyaddition product which can be used according to embodiments of the invention can be selected from the group comprising phenolic antioxidants, e.g. pentaerythrityl tetrakis(3-(3,5-bis(1,1-dimethylethyl)-4-hydroxyphenyl)propionate) (Irganox® 1010), 3,5-di-tert-butyl-4-hydroxytoluene (BHT), stabilizers against oxidation by oxygen, ozone and/or peroxides, and also against discoloration.

Auxiliaries which can be used according to embodiments of the invention can be selected from the group comprising typical auxiliaries and additives, such as lubricants and/or demolding agents, for example at least one of fatty acid esters and silicone compounds, fillers and plasticizers.

In a further embodiment of embodiments of the invention, the molded bodies according to embodiments of the invention are based on an organic polymer which can be prepared by reacting one or more polyfunctional isocyanate components with one or more polyfunctional hardener components.

The terms "polyfunctional hardener component" and "hardener component" are used synonymously in the present description.

The "organic polymer" is a polyaddition product which is formed from the reaction of polyfunctional isocyanates with one or more polyfunctional groups of hardener components.

In the context of embodiments of the present invention, a "transparent molded body" is understood to mean, for example, a molded body which, in the form of a cube with a height, width and length of 50 mm in each case, has a permeability with respect to electromagnetic waves of 300-500 nm of ≥90%, based on 100% of the intensity of the irradiated incident light with a wavelength in the range of 300-500 nm.

In the context of embodiments of the present invention, the UV to IR range includes a wavelength of ≥100 nm to ≤1000 nm, unless stated otherwise.

According to a general embodiment of the invention, the polyfunctional hardener component, hereinafter also called hardener component, may comprise hydroxyl groups, primary amino groups and/or secondary amino groups, which can be replaced at least in part by mercapto groups.

According to a further embodiment of the invention, the isocyanate component and/or the hardener component may comprise up to 100 carbon atoms. Furthermore, the isocyanate component and/or hardener component may comprise further functional groups, for example ether groups, thioether groups, sulfoxide groups, sulfone groups, ester groups, amide groups, urethane groups, urea groups, phosphate groups and or phosphonate groups.

According to a preferred embodiment of the invention, the average functionality of the isocyanate component, i.e. the average number of NCO groups per molecule, is between ≥1.5 and ≤4, preferably between ≥1.9 and ≤2.5 and especially ≥2.0. The isocyanates are available as mixtures or as defined individual substances of technical purity. As far as mixtures are concerned, they can comprise molecules of functionality ≥1 to ≤20, preferably ≥2 to ≤3 and especially 2±0.2.

According to a preferred embodiment of the invention, isocyanate components are suitable which comprise predominantly or exclusively compounds of which the isocyanate groups are bonded to aliphatic carbon atoms.

According to a further preferred embodiment of the invention, isocyanate components are suitable, which are described by the following formula:

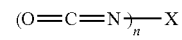

in which n signifies an integer between 2 and 4 and X signifies a radical of functionality n. Radicals of functionality n=2 are particularly preferred. These may comprise aliphatic linear, branched, araliphatic or cyclic and optionally ester groups, ether groups, urea groups and/or amide groups. In addition or instead of the aliphatic radicals, these can preferably comprise mono- or polynuclear aromatic and/or heteroaromatic radicals. Isocyanates of the structure mentioned with aromatic radicals which are derived from benzene, naphthalene or anthracene and/or oxazoles are particularly preferred here.

According to a particularly preferred embodiment of the invention, one or more of the following compounds are used as the isocyanate component, hereinafter also referred to as "polyfunctional isocyanates":
hexamethylene diisocyanate, dimers thereof and/or trimers thereof, e.g. the commercially available products Desmodur® N3300 or Desmodur® N 3400 (60% dimer, 40% trimer), dicyclohexylmethane diisocyanate and isomeric mixtures thereof, 4,4'-methylenebis(cyclohexyl) isocyanate, cis-cis and trans-trans as well as cis-trans isomers thereof, 3-isocyanatomethyl-3,5,5-trimethylcyclohexyl isocyanate, (IPDI), 1,3-bis(1-isocyanato-1-methylethyl)benzene (TMXDI®) and/or isophorone diisocyanate.

Polyfunctional isocyanates which can preferably be used are preferably selected from the group comprising isophorone diisocyanate (IPDI), 1,3-bis(1-isocyanato-1-methyl-ethyl)benzene (TMXDI), hexamethylene diisocyanate (HDI), 4,4'-methylenedicyclohexyl diisocyanate (HMDI) as trans-trans, cis-cis and/or cis-trans isomer, 1,3-bis(isocyanatomethyl)cyclohexane as trans-trans, cis-cis and/or cis-trans isomer, 2,2,4- or 2,4,4-trimethyl-1,6-hexamethylene diisocyanate (TMHDI) and/or mixtures thereof.

In the case of suitable employable polyfunctional isocyanates, the average number of isocyanate groups can be preferably between ≥1.5 and ≤4, preferably between ≥1.9 and ≤2.5 and especially 2.0±0.2.

Polyfunctional isocyanates which can preferably be used have a molar mass of ≥140 g/mol to ≤5000 g/mol, preferably ≥150 to ≤300 and more preferably ≥160 to ≤250. The molar mass is the sum of all atomic masses of the individual elements of the molecule based on one mole of these particles and is stated in mass per mole or g/mol.

According to a further preferred embodiment, the isocyanate component is used as a prepolymer. Prepolymers here are understood to be reaction products of one or more of the aforementioned diisocyanates with a component comprising two or more terminal hydroxyl and/or amino groups, these components being used in a stoichiometric deficit with respect to the isocyanate groups based on hydroxyl groups, of which the hydroxyl groups and/or primary or secondary amino groups react with at least one of the isocyanate groups of the isocyanate component, so that a product having terminal isocyanate groups is obtained.

In order to be able to produce the molded bodies according to embodiments of the invention, the aforementioned isocyanate components are reacted with one or more polyfunctional hardener components, hereinafter called hardener components.

Preferred hardener components are hydroxyl compounds, primary amines or secondary amines of functionality ≥1 to ≤10, preferably ≥2 to ≤4 and especially 2±0.2.

Suitable polyfunctional hardener components are, for example, polyether polyols, polyester polyols, polycaprolactam polyols, polycarbonate polyols and mixtures thereof, and also the products which bear one or more terminal primary or secondary amino groups instead of one or more hydroxyl groups. Among these compounds, preference is given to products having one or more aromatic rings, for example polyethers which have been formed by reacting polyfunctional aromatic hydroxy compounds with at least one of ethylene oxide and propylene oxide in a molar ratio of 1:1 to 1:20, based on at least one of hydroxyl groups, and analogous polyester polyols or polycarbonate polyols.

Preferred polyfunctional groups of hardener components can be hydroxyl and/or amino groups, with amino groups being preferred. Suitable amino groups can be primary or secondary amino groups, wherein preference may be given to primary amino groups.

Preferred polyfunctional hardener components can be selected from the group comprising at least one of alkoxylated bisphenols, especially ethoxylated and/or propoxylated bisphenol A, ethoxylated and/or propoxylated 9,9-bis(4-hydroxyphenyl)fluorene, ethoxylated and propoxylated dihydroxynaphthalene, especially ethoxylated and/or propoxylated 2,6-, 2,7- or 2,3-dihydroxynaphthalene; bis(hydroxyethyl) terephthalate and hydroquinone bis(2-hydroxyethyl) ether and/or mixtures thereof.

According to a preferred embodiment, the hardener component is a polyfunctional alcohol, wherein "alcohol" in the context of embodiments of the invention is also understood to mean phenols.

According to a particularly preferred embodiment, the polyfunctional alcohols (hardener component) used are aliphatic or cycloaliphatic diols having ≥2 to ≤20 carbon atoms.

In particular, the polyfunctional alcohols (hardener component) used are the reaction products aromatic dihydroxy compounds and/or reaction products thereof with an average of 1 to 20 mol of ethylene oxide and/or propylene oxide.

According to a further particularly preferred embodiment, the dihydroxy compound (hardener component) is selected from the group comprising bisphenol A ethoxylate, bis(hydroxyethyl) terephthalate and hydroquinone bis(2-hydroxyethyl) ether and mixtures thereof.

According to a further particularly preferred embodiment, at least one of diamines and triamines having primary or secondary amino groups are used as polyfunctional amines (hardener component).

According to a further embodiment of the invention, the molecular weight of the reaction products of the isocyanate component with the hardener component can be controlled by the stoichiometry of the starting products. If the components are used in such a way that the ratio of OH groups or amino acids to isocyanate groups is 1:1, the highest molecular weights are obtained. According to embodiments of the invention, the stoichiometric ratio of the NCO groups to the sum of the OH groups and primary or secondary amino groups is preferably between ≥0.9 and ≤1.1, especially between ≥0.95 and ≤1.05. The mechanical properties of corresponding products are often also dependent on the degree of crosslinking. Although polyisocyanates are in principle crosslinked via alophanate structures, a person skilled in the art is free to increase the degree of crosslinking by introducing bifunctional compounds on the isocyanate side or on the hardener component side. According to a preferred embodiment of the invention, up to 20 mol % trifunctional isocyanates are used as the isocyanate component.

The decisive factor for the transparency of the molded bodies is that they do not form crystallites that are so large that they scatter the visible light. This applies in particular when larger proportions of aromatic rings are present in or on the polymer chains, which in turn is advantageous for the light yield of the plastic scintillators. A person skilled in the art achieves a reduction in crystallinity by using, for example, diisocyanates having a branched or angled structure, for example cyclohexane derivatives, as the isocyanate component. Here, for example, it is possible to apply the teaching of the international patent application WO 2008/033659 mentioned at the outset.

Furthermore, to prevent yellowing, it is preferred to use only isocyanate components which have few, preferably no benzylic hydrogen, i.e. one or two hydrogen atoms which are bonded to a carbon atom which in turn is bonded directly to a benzene ring.

The molded bodies according to embodiments of the invention can further comprise scintillating organic substances, that is to say substances which emit electromagnetic radiation in the range from 100 nm to 1000 nm if they are struck by high-energy radiation. Some of these scintillating substances convert the energy that they have received by irradiation with high-energy radioactive radiation or particle radiation directly into the range of UV to IR radiation (primary scintillators). Other such substances convert this radiation into short-wave UV light. Since short-wave UV radiation is sometimes more difficult to measure, it is common in this case to add wavelength shifters (secondary scintillators). These are fluorescent molecules that emit long-wave radiation, preferably between 300 and 450, when irradiated with short-wave UV radiation.

BRIEF DESCRIPTION

Figure 2:
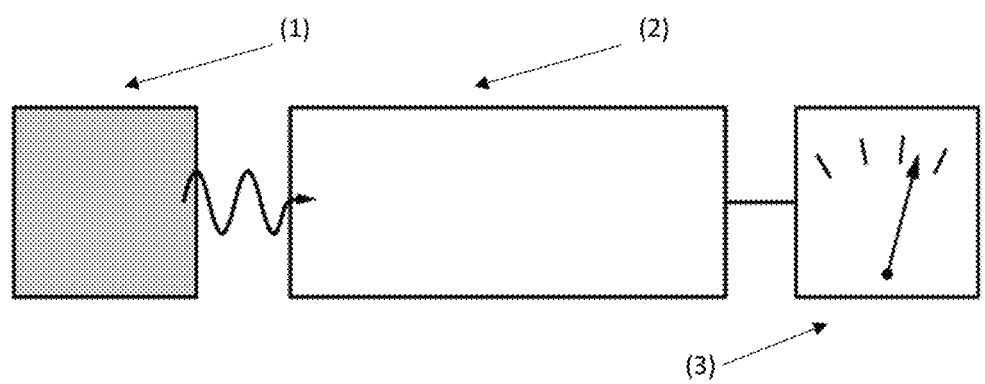

Some of the embodiments will be described in detail, with reference to the following figures, wherein like designations denote like members, wherein:

FIG. 1 shows a simplified schematic representation of the scintillation process; and FIG. 2 shows the structure of such radiation measuring devices.

DETAILED DESCRIPTION

The simplified schematic representation of the scintillation process is shown in FIG. 1. This includes (1) non-ionizing radiation and (2) ionizing radiation. After excitation of atoms or molecules of the scintillating material (3), photons (4) are emitted.

Examples of scintillating and wavelength-shifting substances, to which embodiments of the invention is not restricted, are listed in the following table:

Naphthalene
Biphenyl
TP p-terphenyl 1,1',4,4'-tetraphenylbutadiene
Diphenylstilbene
PPO 2,5-diphenyloxazole
α-NPO 2-(1-naphthyl)-5-phenyloxazole
PBD 2-phenyl-5-(4-biphenylyl)-1,3,4-oxadiazole
BBO [2,5-di(4-biphenyl)oxazole]
POPOP [1,4-bis(2-(5-phenyloxazolyl))benzene]
TOPOT [1,4-di(2-(5-p-tolyloxazolyl))benzene
BiMePOPOP 1,4-di(2-(4-methyl-5-phenyloxazolyl))benzene
DF 2-(diethoxyphenyl)-5-phenyl-1,3,4-oxadiazole
BPO 2-phenyl-5-(4-biphenyl)-1,3-oxazole
3P-Δ2 1,3,5-triphenyl-Δ2-pyrazoline
BBE 1,2-di(4-biphenylol)ethylene
BαNE 1-(4-biphenylyl)-2-(α-naphthylethylene)
2,5-bis(5-tert-butylbenzoxazol-2-yl)thiophene
Bis-MSB 1,4-bis(2-methylstyryl)benzene
2-(4-tert-butylphenyl)-5-(4-biphenylyl)-1,3,4-oxadiazole
trans,trans-1,4-diphenyl-1,3-butadiene
DAN 9,10-diphenylanthracene.

A person skilled in the art can easily determine experimentally the assignment of these substances to primary or secondary scintillators. Reference is made here to the monograph Kolanoski, Hermann; Wermes, Norbert: Particle Detectors: Principles and Applications Heidelberg: Springer Spektrum, 2016. —ISBN 978-3-662-45349-0.

The molded bodies according to embodiments of the invention can also comprise substances which are capable of a nuclear chemical reaction, for example with thermal neutrons or alpha particles. Suitable isotopes of, for example, lithium, gadolinium, boron or other elements are customary here. These substances are often used as salts of organic acids or in the case of boron as borates of amines. Preference is given here to using lithium salts, in particular lithium carbonate or lithium salts of organic acids in amounts of ≥0.05% by weight to ≤5% by weight, based on the molded body.

The molded body according to embodiments of the invention can furthermore comprise substances for stabilizing at least one of the polyaddition product and further auxiliaries. For instance, hydroxphenylbenzotriazole, antioxidants of the sterically hindered phenol type and the like can be used as stabilizers. Polyaddition catalysts can also be present. The molded bodies may also comprise impact modifiers (impact strength improvers). Suitable for this purpose are elastic polymers of similar compositions.

All of the additives mentioned originate from materials which do not substantially impair the light yield of the materials claimed. A reduction in the light yield due to the additives should, for example, not fall below 10%, preferably not below 60%, of the original values based on the molded body without the addition of these additives.

The composition of the molded bodies according to embodiments of the invention can be adapted to the requirements within a wide range of limits by a person skilled in the art. Suitable molded bodies can have the following composition (all percentages by weight relate to the molded body):

≥10% by weight to ≤99.99% by weight of a polyaddition product of polyfunctional isocyanates with at least one of polyfunctional alcohols and amines and amino alcohols, ≥0.01% by weight to ≤90% by weight of further organic substances (at least one of primary and secondary scintillators) scintillating when irradiated with at least one of ionizing radiation, and ≥0.01% by weight to ≤90% by weight of an additive which scintillates when irradiated with at least one of non-ionizing radiation, and ≥0% by weight to ≤5% by weight of substances for stabilizing at least one of the polyaddition product and further auxiliaries.

The contents by weight (% by weight) are based on the total weight of the molded body, the total weight content in % of all components making up or not exceeding 100% by weight.

Particularly preferred ranges are 70% by weight to 95% by weight, in particular 80% by weight to 90% by weight (based on the molded body) of the polyaddition product and 0.05% by weight to 30% by weight, preferably 0.5% by weight to 20% by weight and in particular 0.6% by weight to 5% by weight at least one of primary and secondary scintillators and, if desired, 0.05% by weight to 30% by weight, preferably 1% by weight to 5% by weight of an additive which scintillates when irradiated with non-ionizing radiation and, if desired, 0.1% by weight to 5% by weight of substances for stabilizing the at least one of polyaddition product and further auxiliaries.

According to a further preferred embodiment of the invention, the polyaddition products according to embodiments of the invention comprise at least one of the primary and secondary scintillators covalently bound to the polymer. In order to accomplish this, the scintillator molecules are converted, for example, to hydroxyalkyl compounds. Examples include 2,2'-(naphthalene-2,7-diylbis(oxy))bis(ethan-1-ol) and 2,2'-((9,10-diphenylanthracene-2,7-diyl)bis(oxy))bis(ethan-1-01).

According to a further embodiment of the invention, the scintillator molecules are converted to hydroxymethylene compounds on one or more aromatic rings, which are then used as hardener components.

According to a further embodiment of the invention, lithium is incorporated in the polymer matrix in the form of the salt of a hydroxycarboxylic acid, preferably a dihydroxycarboxylic acid.

According to a further preferred embodiment of the invention, at least one of the primary and secondary scintillators are both incorporated and mixed into the polymer.

Embodiments of the invention further relates to a process for producing a molded body. For this purpose, auxiliaries and additives are dissolved in the hardener component, the hardener component and the isocyanate component are mixed, and the mixture is allowed to react in a form of the desired geometry until it has fully hardened. Preferred embodiments are provided to accelerate the curing process by adding catalyst. The catalysts commonly used here in polyurethane synthesis are, for example, triethylamine, dimethylcyclohexylamine, N-methylmorpholine, N,N'-dimethylpiperazine, 2-(dimethylaminoethoxy)ethanol, diazabicyclo[2,2,2]octane and similar, organic metal compounds such as titanic acid esters, iron compounds such as iron (III)

acetylacetonate, tin compounds, e.g. tin diacetate, tin dioctoate, tin dilaurate or the tin dialkyl salts of aliphatic carboxylic acids such as dibutyltin diacetate, dibutyltin dilaurate or the like.

A further preferred embodiment of the process provides for the hardener component to be made water-free by suitable measures, for example adding solid drying agents, in order to prevent bubbles from being formed by eliminated $CO_2$.

It has also proven useful to harden the casting resin in molds having an inert surface, for example molds made of polytetrafluoroethylene.

The molded bodies according to embodiments of the invention are used in radiation measuring devices. The structure of such radiation measuring devices is shown in FIG. 2. Inside is (1) the plastic scintillator. In this, ionizing radiation is converted to light in the range of UV to IR radiation and is passed into the photosensor (2), which converts it into an electrical current, which the display device (3) indicates.

The plastic scintillators according to embodiments of the invention can be used in measuring devices which, on the one hand, measure ionizing and non-ionizing radiation within a very large energy range thereof and can be scaled very well in terms of their size and thus the detection sensitivity.

The plastic scintillators according to embodiments of the invention can be offered in standard sizes as rods, plates and cylinders. The requirements for sensitivity and energy range determine the size and type of the measuring systems, which range from hand-held devices with a single scintillator to extremely heavy measuring devices with thousands of scintillators.

The plastic scintillators according to embodiments of the invention can be used in measuring devices which are used for measurements at high radiation levels. [LAMBERT, J., et al. A plastic scintillation dosimeter for high dose rate brachytherapy. Physics in medicine and biology, 2006, 51st Vol., No. 21, p. 5505.]

Particles and electromagnetic radiation in the range from a few keV to TeV are detected in different applications. For instance, calorimeters with plastic scintillators are standard instruments on many particle accelerators. [CMS COLLABORATION, et al. CMS physics technical design report, volume II: physics performance. Journal of Physics G: Nuclear and Particle Physics, 2007, 34. Vol., No. 6, p. 995.]

The plastic scintillators according to embodiments of the invention can be used in measuring devices as are customary for measurements in astrophysics [Abdo, Aous A., et al. "Measurement of the cosmic ray e++ e− spectrum from 20 GeV to 1 TeV with the Fermi Large Area Telescope." Physical Review Letters 102.18 (2009): 181101.]

Furthermore, the plastic scintillators according to embodiments of the invention can be used in measuring devices, as are common in portal monitors in the wide application field of homeland protection. [ELY, James H., et al. Discrimination of naturally occurring radioactive material in plastic scintillator material. In: Nuclear Science Symposium Conference Record, 2003 IEEE. IEEE, 2003. pp. 1453-1457].

Plastic scintillator-based measuring devices have a light-sensitive sensor that converts the scintillation radiation into electrical impulses for further processing, described for example in KNOLL, Glenn F. Radiation detection and measurement. John Wiley & Sons, 2010, p. 247.

Examples of preferred diisocyanate and a hardener component:

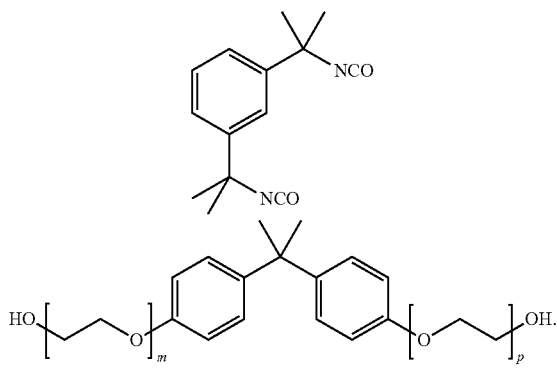

Example 1

Additives according to the table below were dissolved in 2 g of bisphenol A ethoxylate. After addition of 1 g of 1,3-bis(1-isocyanato-1-methylethyl)benzene, 0.5% by weight of dibutyltin dilaurate was added to the reaction mixture, whereby a transparent polyurethane was obtained after 1 to 5 hours.

| Sample | PPO [% by weight] | POPOP [% by weight] | DAN [% by weight] | p-Ter [% by weight] | BMB [% by weight] | Light yield [pC] |
|---|---|---|---|---|---|---|
| 1 A | 0.5 | 0.02 | — | — | — | 40 |
| 2 A | 1 | 0.02 | — | — | — | 43 |
| 3 A | 2.5 | 0.2 | — | — | — | 43 |
| 4 A | 5 | 1 | — | — | — | 46 |
| 5 A | 5 | 0.2 | — | — | — | 45 |
| 6 A | 10 | 0.2 | — | — | — | 47 |
| 7 A | 30 | 0.5 | — | — | — | 44 |
| 1 B | 1 | — | — | — | 0.02 | 34 |
| 1 C | 5 | — | — | — | — | 30 |
| 1 D | — | — | 1 | — | — | 25 |
| 1 E | — | 0.2 | — | 1 | — | 25 |
| 1 F | 1 | — | 0.02 | — | — | 42 |

Example 2

The additives in % by weight were dissolved in 2 g of bisphenol A ethoxylate according to the table below. After addition of 0.9 g of isophorone diisocyanate (sample names: 1-IPDI and 2-IPDI) or 0.76 g of m-xylylene diisocyanate (sample names: 1-MX, 2 MX, 3 MX), 0.5% by weight of dibutyltin dilaurate was added to the reaction mixture, after which a transparent polyurethane was obtained.

| Sample | PPO [% by weight] | POPOP [% by weight] | p-Ter [% by weight] | Bis-MSB [% by weight] | Light yield [pC] |
|---|---|---|---|---|---|
| 1 IPDI | 5 | — | — | — | 28 |
| 2 IPDI | — | 1 | 3 | — | 26 |
| 1 MX | 3 | 0.02 | — | — | 42 |
| 2 MX | 1 | 0.02 | — | — | 40 |
| 3 MX | — | — | 1 | 0.05 | 36 |

Abbreviations:
PPO 2,5-diphenyloxazole
POPOP 1,4-bis(5-phenyl-2-oxazolyl)benzene
p-Ter p-terphenyl
DAN 9,10-diphenylanthracene Bis-MSB 1,4-bis(2-methylstyryl)benzene Determination of the Light Yield:
1. A cylindrical plastic scintillator sample of 15 mm diameter and 10 mm length is connected to the end face of the photocathode of a photomultiplier tube (PMT) from Hamamatsu with optically transparent grease so that light quanta from the sample can illuminate the photocathode.
2. The sample is irradiated with gamma quanta at a distance of 50 mm by a Cs-137 emitter of 4 µCi intensity.
3. The current pulses thereby generated on the PMT anode are recorded with an oscilloscope from LeCroy, integrated and sorted according by height in a histogram, the gamma spectrum (PHA method, Pulse Height Analysis).
4. The position of the characteristic Compton edge in the gamma spectrum is proportional to the amount of light that the scintillator emits.
5. The position of the Compton edge is compared to that of a known scintillator sample and thus enables the calculation of the photons/MeV, the light output of the sample material.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A transparent molded body for use as a plastic scintillator for measuring a type and an intensity of at least one of ionizing and non-ionizing radiation, comprising:
an organic polymer,
wherein the organic polymer, at least in part, contains a polyaddition product of polyfunctional isocyanates with one or more polyfunctional hardener components, wherein —NCO groups of the polyfunctional isocyanates are connected to aliphatic carbon atoms, wherein —OH groups or primary amino groups of the one or more polyfunctional hardener components are connected to aliphatic carbon atoms, wherein the organic polymer is a primary scintillator and emits scintillation radiation in a range from UV to IR light under the influence of ionizing and/or non-ionizing radiation; and
wherein a) the polyfunctional isocyanates are diisocyanates comprising mononuclear or polynuclear aromatic and/or heteroaromatic groups, and/or b) the one or more polyfunctional hardener components comprise one or more aromatic rings, wherein the polyfunctional hardener components are selected from the group comprising bisphenol A ethoxylate, bis(hydroxyethyl) terephthalate and hydroquinone bis(2 hydroxyethyl) ether and mixtures thereof.

2. The molded body as claimed in claim 1, further comprising an additive as a secondary scintillator, the additive being designed to emit long-wave radiation when irradiated with short-wave UV radiation, and wherein the body comprises:
≥10% by weight to ≤99.99% by weight of a polyaddition product of polyfunctional isocyanates with at least one of polyfunctional alcohols, phenols, amines, amino alcohols and aminophenols,
≥0.01% by weight to ≤90% by weight of other organic substances scintillating when irradiated with at least one of ionizing radiation and non-ionizing radiation,
≥0.01% by weight to ≤90% by weight of an additive which scintillates when irradiated with non-ionizing radiation,
≥0% by weight to ≤5% by weight of substances for stabilizing at least one of the polyaddition product and further auxiliaries.

3. The molded body as claimed in claim 2, wherein the additive scintillates when irradiated with the at least one of ionizing and non-ionizing radiation, and are at least partially covalently incorporated in or are bound to the polymer structure, or is or is present as dissolved or dispersed particles in the organic polymer.

4. The molded body as claimed in claim 1, wherein the polyfunctional isocyanates are selected from the group consisting of: isophorone diisocyanate, 1,3-bis(1-isocyanato-1-methylethylbenzene, hexamethylene diisocyanate, 4,4-methylenebis(cyclohexyl isocyanate) as at least one of trans-trans, cis-cis and cis-trans isomer, 1,3-bis(isocyanatomethyl)cyclohexane as at least one of trans-trans, cis-cis, cis-trans isomer and mixtures of diisocyanates.

5. The molded body as claimed in claim 1, wherein the polyfunctional isocyanates are trimerization products of diisocyanates having reaction products thereof with a stoichiometric deficit of di- or at least one of trifunctional alcohols, amines and amino alcohols.

6. The molded body as claimed in claim 1, wherein a stoichiometric ratio of the —NCO groups of the polyfunctional isocyanate to a sum of the —OH groups and primary amino groups of the polyfunctional hardener component is between ≥0.9 and ≤1.1.

7. The molded body as claimed in claim 1, wherein the polyfunctional isocyanates comprise trifunctional isocyanates, and a proportion of trifunctional iscoyanates relative to the polyfunctional isocyanates being ≥0% by weight to ≤20% by weight.

8. The molded body as claimed in claim 1, further comprising modifiers present in a polymer chain, wherein the modifiers are hydroxymethylation products of at least one of aromatic scintillators and lithium salts of polyhydroxycarboxylic acids.

9. The molded body as claimed in claim 2, wherein the additive, which scintillates on irradiation with the at least one of ionizing and non-ionizing radiation, are polynuclear aromatic compound/s selected from the group consisting of: napthalene; biphenyl; diphenyl stilbene; 2-(1-naphthyl)-5-phenyloxazole (α-NPO); 2-phenyl-5-(4-biphenylyl)-1,3,4-oxadiazole (PBD); 2,5-di(4-biphenyl)oxazole (BBO); 1,4-di(2-(5-p-tolyloxazolyl))benzene (TOPOT); 1,4-di(2-(4-methyl-5-phenyloxazolyl))benzene (BiMePOPOP); 2-(diethoxyphenyl)-5-phenyl-1,3,4-oxadiazole (DF); 2-phenyl-5-(4-biphenyl)-1,3-oxazole (BPO); 1,3,5-triphenyl-Δ2-pyrazoline (3P-Δ2); 1,2-di(4-biphenylol)ethylene (BBE); 1-(4-biphenylyl)-2-α-naphthylethylene (BαNE); 2,5-bis(5-tert-butylbenzoxazol-2-yl)thiophene; 2-(4-tert-butylphenyl)-5-(4-biphenylyl)-1,3,4-oxadiazole; trans,trans-1,4-diphenyl-1,3-butadiene.

10. The molded body as claimed in claim 2, wherein the secondary scintillator is present in amounts from ≥0.01% by weight to ≤90% by weight or in amounts from ≥0.05% by weight to ≤5% by weight.

11. The molded body as claimed in claim 3, comprising a substance scintillating on irradiation with neutrons, wherein the substance scintillating on irradiation with neutrons is lithium salts, or lithium carbonate, in amounts from ≥0.05% by weight to ≤5% by weight.

12. The molded body as claimed in claim 1, wherein free radical scavengers are present as stabilizer in amounts from ≥0.1% by weight to ≤5% by weight.

13. The molded body as claimed in claim 1, wherein an impact modifier is present as further auxiliary.

14. A process for producing a molded body as claimed in claim 1, wherein auxiliaries and additives are dissolved in the hardener component, the hardener component and isocyanate component are mixed, if required a curing catalyst is added and the mixture is allowed to react in a form of the desired geometry until hardening.

15. A radiation measuring device comprising a molded body as claimed in claim 1 as a scintillator.

* * * * *